Sept. 28, 1937.    G. A. LYON    2,094,328
REAR SPARE TIRE SUPPORT AND COVER
Filed April 30, 1934    4 Sheets-Sheet 1
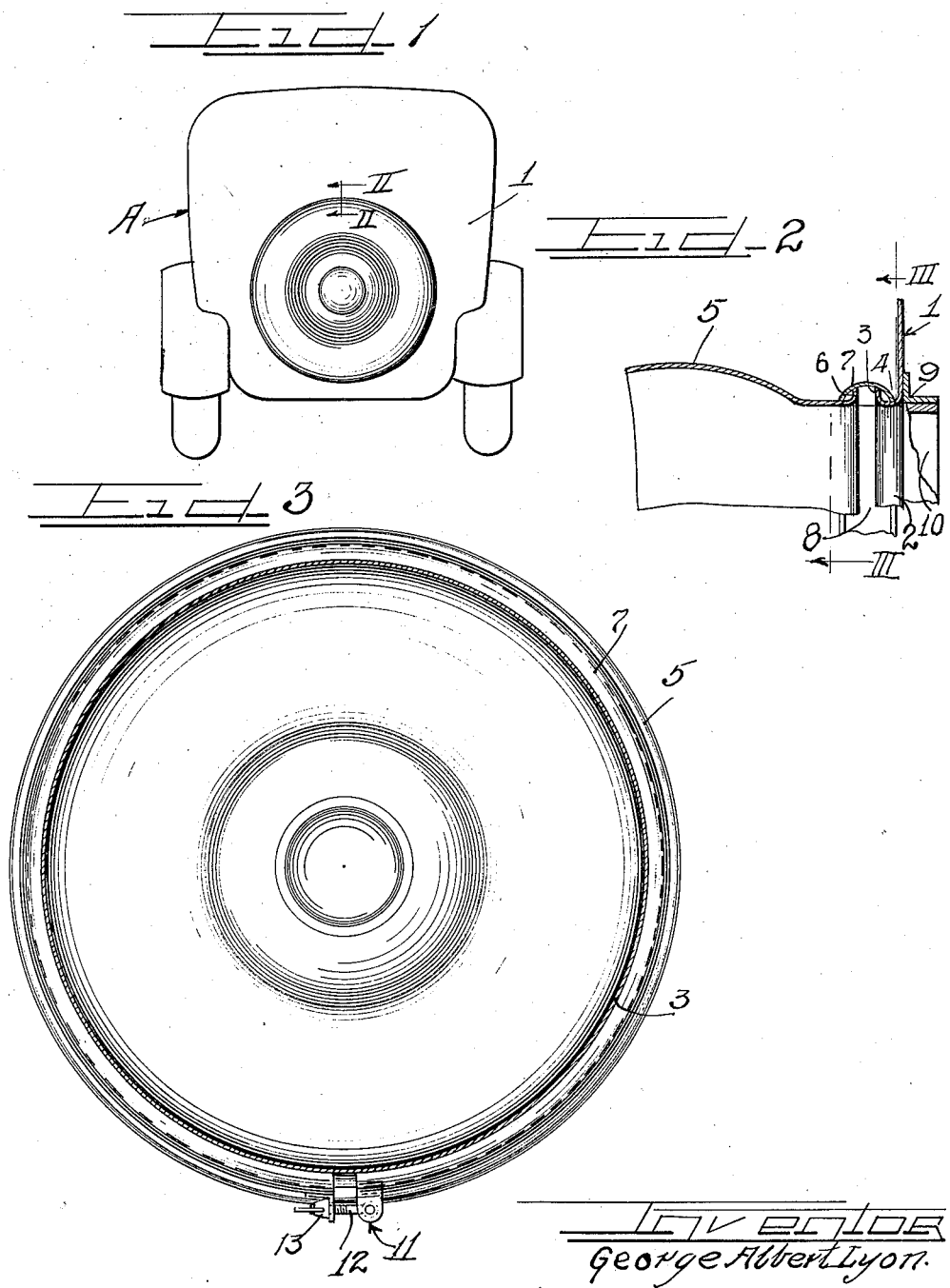

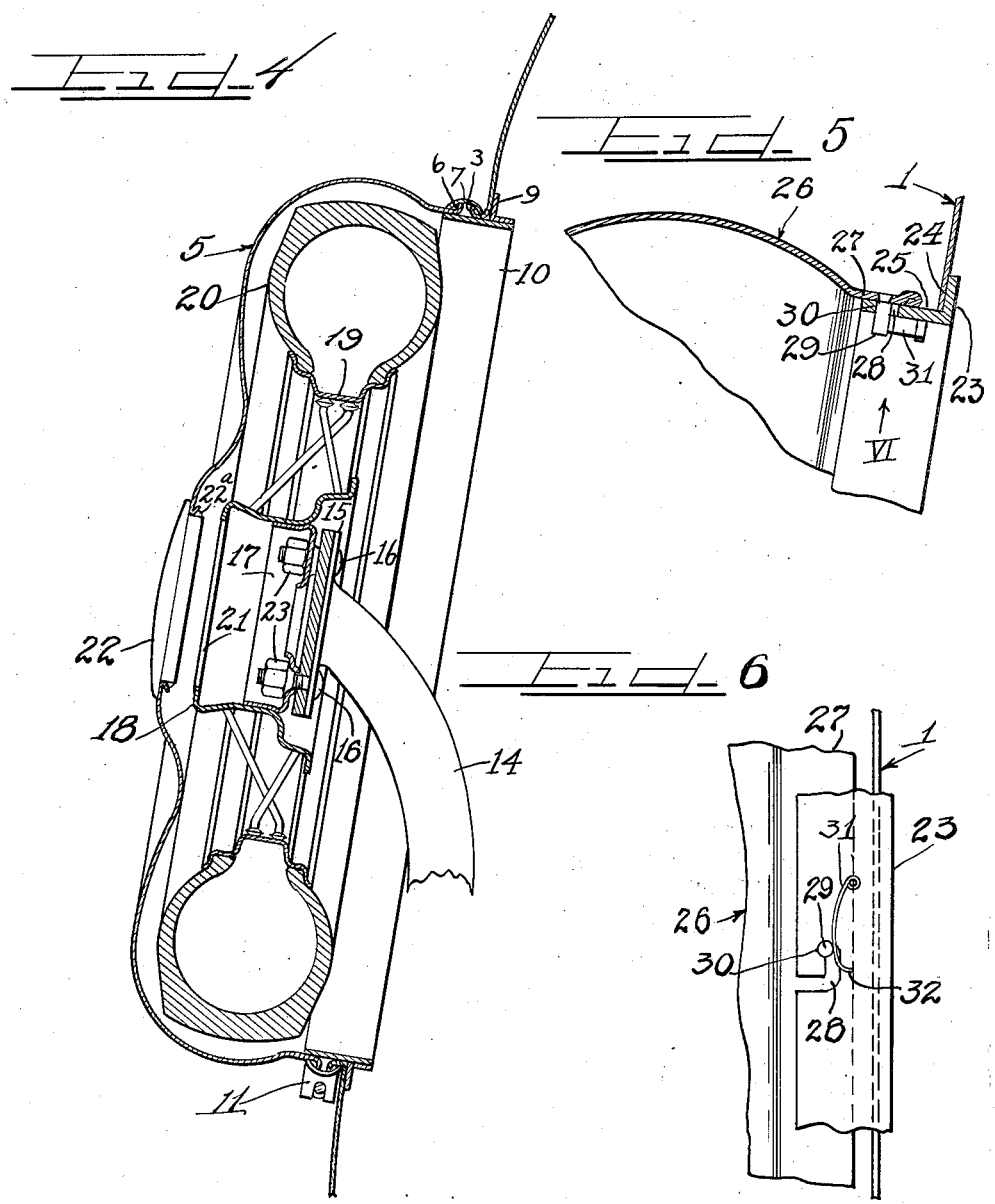

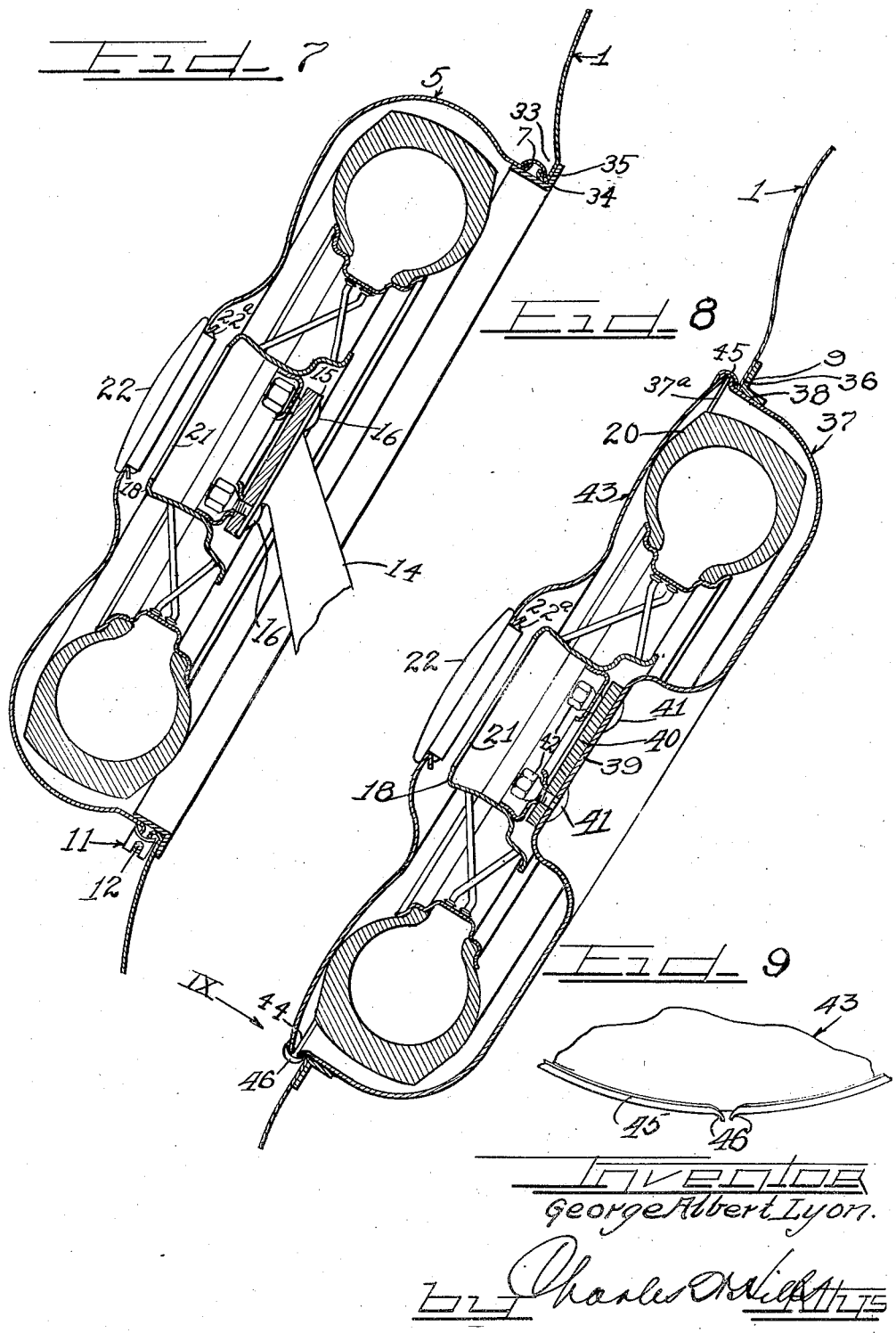

Sept. 28, 1937.  G. A. LYON  2,094,328
REAR SPARE TIRE SUPPORT AND COVER
Filed April 30, 1934  4 Sheets-Sheet 4
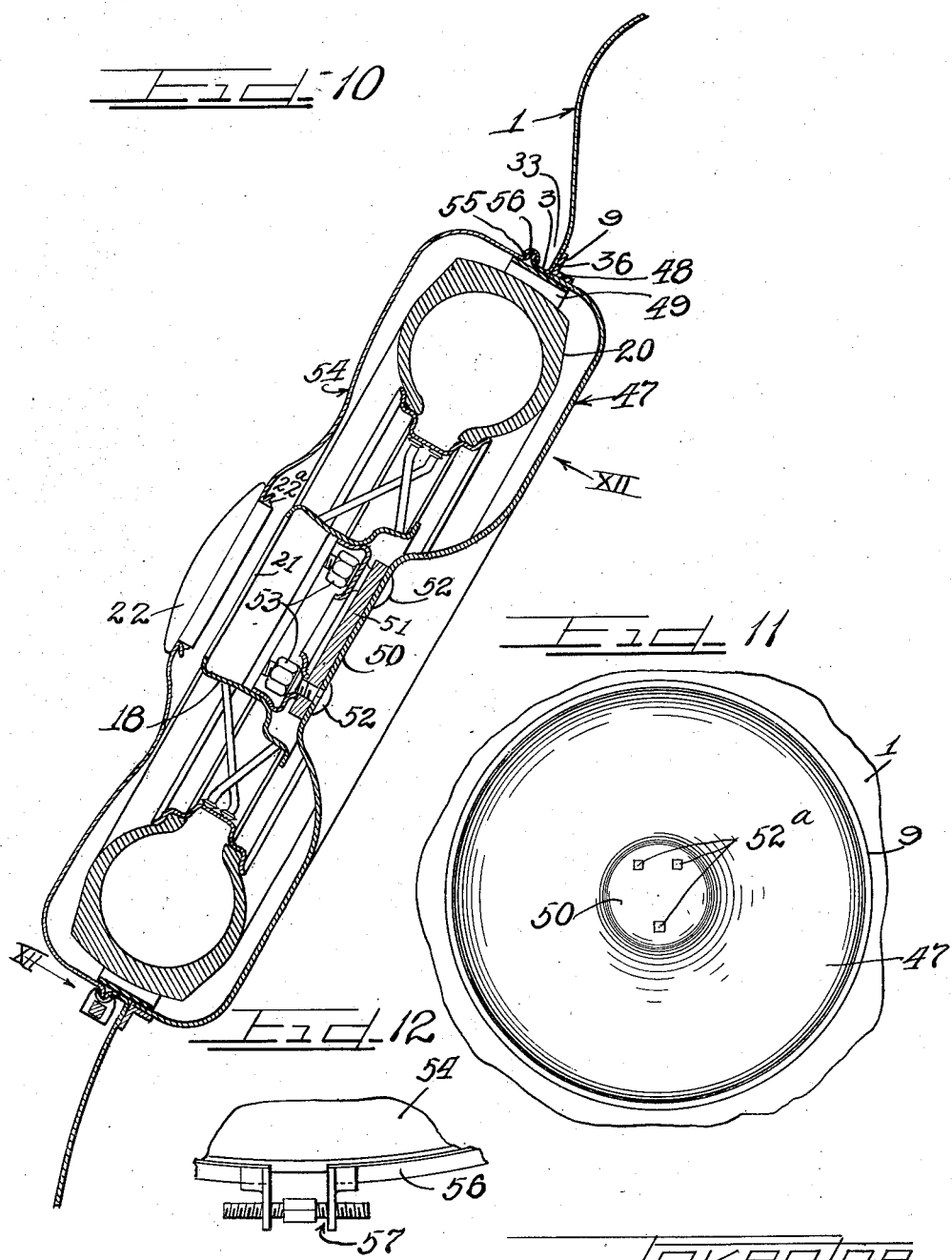
Inventor
George Albert Lyon.

Patented Sept. 28, 1937

2,094,328

UNITED STATES PATENT OFFICE 2,094,328

REAR SPARE TIRE SUPPORT AND COVER

George Albert Lyon, Detroit, Mich., assignor to Lyon Incorporated, Detroit, Mich., a corporation of Delaware Application April 30, 1934, Serial No. 723,045

2 Claims. (Cl. 296—37)

This invention has to do with tire covers and is concerned more particularly with improved supporting and covering means for a tire and wheel carried at the rear of an automobile.

It is an object of the invention to provide a tire cover construction and a support therefor, the support constituting part of the vehicle body.

It is another object of the invention to provide the vehicle body with an opening and project therethrough a spare wheel carrier.

It is another object of the invention to provide an automobile body with an opening through which the spare wheel carrier projects, the rim of the opening being formed to provide a supporting means for a cover for the spare wheel and tire mounted on the carrier.

Another object of the invention resides in means whereby a spare wheel and tire cover may be mounted on the automobile body adjacent the outer surface thereof.

It is another object of the invention to provide a cover construction in conjunction with the outer surface of an automobile body, such that the cover has the appearance of being a continuation of the body.

It is a still further object of the invention to provide an automobile body with a well for supporting and receiving substantially the entire spare wheel and tire, and providing a cover which lies substantially in the plane of the automobile body adjacent the well, for streamlining purposes.

In accordance with the general features of the invention, the body, preferably at the rear thereof, is provided with an opening of approximately the diameter of the tread of the spare tire, and in said opening there is disposed a carrier for the wheel and tire. The carrier may be in the form of a well fastened in said opening, or it may be a bracket extending outwardly through the opening, the support in either case preferably providing means whereby the hub of the spare wheel may be attached thereto. The body adjacent the opening is provided with an outwardly turned lip and the rear margin of the cover is likewise formed, the lips being received in a split ring which is contractible to hold the lips together.

In accordance with another form of the invention, the cover member is connected to the body by a bayonet joint.

The construction is such as to render the cover member readily attachable and removable relative to the body, and prevents the entrapment of moisture, dirt and the like between the body and the spare tire and wheel, which would otherwise render the cleaning of the body difficult.

Other objects and advantages of the invention will appear as the description proceeds.

This invention (in preferred forms) is illustrated in the drawings and hereinafter more fully described.

On the drawings:

Figure 1 is a view of the rear of an automobile body on which a tire cover constructed in accordance with the present invention is mounted.

Figure 2 is an enlarged fragmentary sectional view taken substantially in the plane designated by the line II—II in Figure 1.

Figure 3 is a sectional view of the rear of the cover and associated structure, taken substantially in the planes designated by the line III—III in Figure 2, with a positive connection added to the supporting ring.

Figure 4 is a view similar to Figure 2 but is reduced and more complete to show the form of the tire cover and the spare wheel carrier with the spare wheel and tire mounted thereon, certain parts being shown in elevation for convenience.

Figure 5 is a view similar to Figure 2 but showing a modified form of the invention wherein the cover is mounted by a bayonet connection.

Figure 6 is a fragmentary bottom plan view taken as indicated by the arrow VI in Figure 5.

Figure 7 is a view similar to Figure 4 but showing a modified connecting ring construction.

Figure 8 is a view similar to Figure 7 but shows a modified wheel supporting and cover construction.

Figure 9 is a fragmentary elevational view showing the split ring construction of Figure 8, taken substantially as shown by the arrow IX in Figure 8.

Figure 10 is a view similar to Figure 8 but shows a somewhat modified form of the invention.

Figure 11 is a rear elevational view of the spare wheel carrier and associated body construction of Figure 10, looking in the direction of the arrow XI.

Figure 12 is an enlarged fragmentary elevational view of the bottom of the connecting means of Figure 10, taken substantially as indicated by the arrow XII.

Referring now more particularly to the drawings, the automobile A is provided with a body 1 of sheet steel or the like and, in the forms of the invention appearing in Figures 1 to 4, 7, 10 and 12, is formed with an opening 2 and has its margin adjacent the opening flanged outwardly at 3 to provide an outwardly opening peripheral recess 4. The opening 2 in the body 1 is preferably approximately equal in diameter to the tread of the tire for a reason which will be hereinafter set forth.

In the form of the invention appearing in Figures 1 to 4, the lip or flange structure 3 serves as a support for a tire cover member 5. The member 5 is shaped to conform generally to the spare wheel and tire, both transversely and circumferentially, and is constructed to cover the outer side of the spare wheel and tire and to extend transversely substantially entirely across the tread of the tire and terminates adjacent the lip 3 in a similar lip 6 whose inside diameter is such as to enable said lip to clear the tread of the tire.

To the end that the cover 5 may be supported by the body 1, there is provided a resilient expansible and contractible split ring 7 which is transversely concavo-convex with its concave surface innermost. The ring 7 is thus formed to be fitted about and receive the lips 3 and 6, bridging the gap 8 therebetween and having its margins straddling said lips so as to be interlocked therewith. The spring ring 7 is formed so as to be inherently contractible to a diameter less than that of the parts of the lips 3 and 6 engaged thereby, so that said ring serves as a means for connecting the cover member 5 to the body 1 and holding the cover member in substantially coaxial relation to the spare wheel and tire, the mounting means for which will appear as the description proceeds. So that the body 1 may perform the function of supporting the cover member 5, said body adjacent its lip 3 is reinforced as by the circular angle iron 9. To hold the cover member 5 temporarily in juxtaposition to the lip 3, there is provided a preferably circular band 10 secured to the reinforcing member 9 and extending outwardly therefrom sufficiently to fit within the lip 6 of the cover member 5. The parts are so arranged that the split ring 7 tightly holds the cover member 5 in proper relation to the body 1 and prevents rattling between the parts.

While the ring member 7 may serve by reason of its inherent tendency to contract to hold the cover member 5 in position, the holding effect of the split ring 7 may be made positive by the attachment thereto of a clamping bolt structure 11 including brackets connected to the respective ends of the split ring, a bolt 12 pivoted to one bracket and swingable into the other bracket, and a nut applied to the free end of the bolt at 13. Any other suitable tightening means such as toggle mechanism, turnbuckle mechanism or the like may be employed for this purpose, if desired.

Attached to the chassis (not shown) or any other suitable part of the vehicle structure is a spare wheel carrier bracket 14 which extends through the opening 2 in the body 1 and is provided with a flange structure 15 which preferably permanently carries attaching studs 16 projecting outwardly so as to be received in corresponding openings in the attaching collar 17 of the hub 18 of the spare wheel 19 on which the spare tire 20 may be mounted. The carrier 14 is so arranged that when the spare wheel and tire are mounted thereon, they are arranged substantially coaxial with the lip 3 of the body 1. Thus when the cover member 5 is mounted in proper tire and wheel covering position, said cover member is substantially coaxial with the spare wheel and tire.

The cover member 5 is preferably provided with a substantially central opening of substantially the same diameter as the front opening 21 in the hub 18 so that a hub cap 22 designed for releasable interlocking relation to the hub may be interlocked likewise with the cover member 5. The cap 22 may be of any desired construction and preferably is provided with spring latches 22a which enable the cap to be readily interlocked and released with respect to the hub 18 or cover member 5, as the case may be.

In order to provide access to the nuts 23 by means of which the spare wheel is mounted on the carrier 14, it is necessary merely to pry off or otherwise remove the cap 22. To remove the cover member 5, it is necessary merely to expand the split ring 7 sufficiently to enable the same to be removed from the body lip 3 or to allow the lip 6 to be moved axially out of telescoping relation to the split ring 7.

A somewhat modified means for mounting the cover member is shown in Figures 5 and 6, wherein the body 1 is formed with an opening of substantially the same size as the opening 2 hereinabove referred to and is reinforced by a flanged ring 23 united to the body 1 as by welding at 24, riveting or the like and extends outwardly from said opening to provide a peripheral bearing surface 25. The cover member 26 is formed substantially identical with the cover member 5 except that at the rear thereof it is substantially cylindrical at 27 so as to fit over and engage the bearing surface 25. The rear edge portion of the cover member 26 is bent upon itself to provide a smooth handling edge.

The cylindrical portion 25 of the ring 23 is provided with outwardly opening bayonet slots 28 preferably equidistant circumferentially, three being preferably employed although a different number may be provided if desired. The cylindrical rear portion 27 of the cover member 26 is correspondingly provided with pins 29 adapted to be slipped into the slots 28 and positioned in the locking recesses 30 at the innermost ends of the slots 28 as shown in Figures 5 and 6. A spring 31 is secured at 32 within the ring 23 adjacent each slot 28 so as to bear against the corresponding pin 29 when the same is disposed in the recess 30, to thereby prevent accidental separation of the cover member 26 and ring 23. Said spring is curved rearwardly at its free end 32 so as not to interfere with the placing of the pin in said recess, said spring being arranged, when free, to be cammed rearwardly as the pin is being moved into and out of the recess 30.

With this construction, it is obvious that the cover may be applied to and removed from the body by substantially a single operation and that, when the cover is mounted, it is prevented from accidentally being lost or falling off the ring 23.

In the form of the invention appearing in Figure 7, the body 1 is recessed at 33 adjacent its opening and reinforced by a ring of angular cross-section as shown at 34, said ring being welded at 35 to the body 1, or otherwise suitably secured thereto. The ring 34 has a substantially cylindrical outwardly extending flange 34 arranged to fit within the lip 3 and to temporarily support the cover member 5 by its lip 6. The lips are interlocked with the resilient split ring 7 as described above, and when so interlocked, the upper part of the cover member 5 is disposed substantially within the streamlines extending from the upper part of the body 1 so as to offer substantially no air resistance when the automobile moves forwardly. In Figure 7, the ends of the ring 7 are shown to be connected through the bolt and nut mechanism 11 shown in another view in Figure 3. However, if desired, the ring 7 may have its ends free, its inherent contractiveness serving to mount the cover member 5 on the body 1.

A still further modified form of the invention is shown in Figure 8, wherein the body 1 is provided with an opening which is substantially greater than the maximum diameter of the tire and is reinforced interiorly by a ring such as the ring 9 above described, said ring being welded at 36 or otherwise suitably secured to the body. A pan-like holder 37 is disposed in said opening and welded at 38, riveted or otherwise suitably secured to the ring 9. The well 37 is of such depth as to substantially entirely receive the spare wheel and tire, its margin being turned outwardly over the body 1 to provide a lip 37a. The well 37 is bulged forwardly substantially centrally thereof to provide a wall 39 reinforced by a plate 40 preferably permanently united thereto as by welding, riveting or the like, and also preferably permanently carries mounting studs 41 arranged to project through corresponding openings in the hub 18 and receive nuts 42 whereby to properly mount the spare wheel in substantially coaxial relation to the pan 37.

When the wheel is thus mounted on the pan 37, the tire 20 preferably projects outwardly somewhat beyond the plane of the lip 37a. The cover member 43 comprises a plate arranged to cover the outer side of the spare wheel and tire and to terminate outwardly somewhat beyond the outer periphery of the tire and so as to have an outer diameter substantially the same as that of the lip 37a as shown at 44. The parts are preferably so arranged that when the cover member 43 is in engagement with the outer side of the tire 20, the cover member 43 is slightly spaced from the lip 37a. To hold the cover member 43 mounted on the well 37, there is provided a resilient expansible and contractible split ring 45 which is interiorly concave and receives the lip 37a and outer peripheral portion 44 of the cover member 43, the structure of the ring member 45 being such as to enable the same to hold the cover member 43 and lip 37a in assembled relation by reason of the inherent contractive characteristic of the ring 45. The ring 45 is moreover so formed as to constantly exert a pressure on the cover member 43 so as to urge the same against the tire 20, thereby serving to prevent rattling.

With this construction, it is to be observed that the cover structure is arranged so as to be substantially within the streamlines passing rearwardly from the upper part of the body 1, so as to therefore offer substantially no air resistance.

The cover member 43 is provided preferably with a substantially central opening of substantially the same diameter as that of the front opening 21 of the spare wheel hub 18 so as to releasably receive the hub cap 22 in the manner hereinabove described.

The connecting spring ring 45 is preferably formed with outwardly turned ends 46 to enable the same to be easily grasped when it is desired to expand the ring 45 and allow the cover member 43 to be removed.

In Figures 10, 11 and 12 a somewhat modified form of the invention is shown. The body 1 is recessed at 33 as above described to bring the cover structure substantially within the streamlines extending rearwardly from the top of the body 1 and is provided with an opening of substantially greater diameter than that of the tread of the tire and is turned outwardly to provide the lip 3 as hereinabove described. The body 1 is reinforced by a ring member 9 adjacent the lip 3 but inwardly of the body as hereinabove described, the ring 9 being preferably welded at 36 or otherwise suitably secured to the body 1.

A pan-like member 47 is disposed so that its outer margin is welded at 48 or otherwise suitably secured to the reinforcing ring 9, so that the inner periphery of said margin is substantially flush with the inner periphery of the lip 3. A reinforcing and bearing band 49 is suitably united with said margin and extends outwardly beyond the lip 3. The pan-like member or well 47 is substantially shallower than the pan-like member 37 so as to allow the tire to project to a substantial degree outwardly beyond the body 1 as shown in Figure 10. The well 47, like the well 37, is provided with a central forwardly projecting wall 50 provided with a preferably permanently connected reinforcing flange 51 and carrying preferably permanently connected studs 52 arranged to project through corresponding openings in the spare wheel hub 18 and to receive nuts 53 whereby the spare wheel and tire may be supported by the well 47 in substantially coaxial relation thereto.

The cover member 54 is formed circumferentially and transversely to simulate the outer side of the spare wheel and tire and the adjacent tread portion of the tire and its free margin is bent outwardly to provide a lip 55 of substantially the same outer dimension as the lip 3 to be received within a spring ring 56 and to cooperate therewith in the manner hereinabove described, so that said spring ring may serve to connect the cover member 54 to the body 1 and enable the latter to support the former. Any suitable means such as the turnbuckle mechanism 57 applied to the ends of the ring 56 may be employed for forcibly tightening the ring 56 about the lips 3 and 55 to prevent accidental removal of the cover member 54.

The band 49 projects outwardly beyond the lip 3 sufficiently to provide a temporary support for the cover member 54 adjacent its lip 55 before the ring 56 is tightened in place and after the same is removed.

The cover member 54 may be provided with a substantially central opening of substantially the same diameter as the front opening in the wheel hub 18 for detachably receiving the hub cap 22 in the manner hereinabove described.

The openings for the studs 52 are shown at 52a in the well 47 in Figure 11.

The tire cover members of the various forms of the invention herein described are preferably made of thin sheet material such as sheet metal, hard rubber, rubber composition, fibre, phenolic condensation product or the like, and are preferably substantially form-retaining. The spring rings of the various forms herein described are preferably made of sheet metal, although if desired other material having the desired properties may be employed. Such rings may if desired be given a polished outer finish such as chrome plate or may be enameled in the color desired. These rings serve not only to hold the parts in assembled relation, but have a highly ornamental effect, whereby to improve the appearance of the cover and of the vehicle as a whole. The pan-like members are preferably of stronger construction than the body and cover members because of the fact that the same must sustain the weight of the spare wheel and tire.

It will be seen that with this construction there is no space between the spare wheel and tire and the body, to permit entry of moisture, dirt and the like as has heretofore been the case. On the contrary, the body terminates adjacent the outer periphery of the tire, and is assembled with the cover in such a manner as to inhibit the leakage of moisture, dirt and the like to the interior of the cover, the entire surface of the body adjacent the spare wheel and tire being readily washable without requiring removal of the spare wheel and tire.

The split ring members of the various forms of the invention may be entirely separable from the associated cover and body parts, or, if desired, may be secured intermediate its ends to one or the other of said parts and still capable of expansion and contraction for the purposes above set forth.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In combination with an automobile body having a well portion therein adapted to receive a spare wheel and tire, said well portion being provided with a free outer marginal edge, a cover member for disposition over the open face of said well having an outer marginal portion which extends into close proximity with said free edge of said well portion, and a resilient split ring which in its unstrained position has a diameter smaller than that of said cover member fitted thereon to snugly embrace said well edge and said cover member edge, thereby to mount said cover member in desired position.

2. In combination with an automobile body having a well portion therein adapted to receive a spare wheel and tire, said well portion being provided with a free outer marginal edge, a cover member for disposition over the open face of said well having an outer marginal portion which extends into close proximity with said free edge of said well portion, and a resilient expansible and contractible ring member which engages and maintains said well edge and said cover edge together by its inherent resiliency.

GEORGE ALBERT LYON.